(12) United States Patent
Blair et al.

(10) Patent No.: US 6,706,310 B2
(45) Date of Patent: *Mar. 16, 2004

(54) TEA PRODUCT

(75) Inventors: Ruth Louisa Blair, Bedford (GB); Andrew David Parry, Bedford (GB); Peter Joseph Stabler, Bedford (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/187,673

(22) Filed: Jul. 2, 2002

(65) Prior Publication Data

US 2003/0077373 A1 Apr. 24, 2003

Related U.S. Application Data

(63) Continuation of application No. 09/630,835, filed on Aug. 2, 2000, now Pat. No. 6,432,467.

(30) Foreign Application Priority Data

Aug. 12, 1999 (EP) .............................. 99306370

(51) Int. Cl.[7] .................................................. A23F 3/00
(52) U.S. Cl. ....................................... 426/597; 426/435
(58) Field of Search .................................. 426/597, 435

(56) References Cited

U.S. PATENT DOCUMENTS 6,432,467 B1 * 8/2002 Blair et al.

FOREIGN PATENT DOCUMENTS

| GB | 1546508 | * | 5/1979 |
| WO | 99/40799 | | 8/1999 |
| WO | 00/10401 | | 3/2000 |

OTHER PUBLICATIONS

International Search Report (PCT/EP 00/06900).

"Determination and Characterization of the Structure of a Pore Space from 3D Volume Images", Journal of Colloid and Interface Science; C. Baldwin, A. Sederman, M. Mantle, P. Alexander and L. Gladden; 181 (1996); pp. 79–92; Article No. 0358; Academic Press Inc.

"Applications of Nuclear Magnetic Resonance Imaging in Process Engineering"; Measurement Science and Technology; L. Gladden and P. Alexander; 7 (1996); pp. 423–435; IOP Publishing Ltd.

"The Chemistry and Biochemistry of Black Tea Production– The Non–Volatiles"; Tea: Cultivation to Consumption, edited by K.C. Wilson and M.N. Clifford, 1992, Chapman & Hall, London, Chapter 17.

* cited by examiner

Primary Examiner—Anthony J. Weier

(57) ABSTRACT

Black leaf tea that has the appearance of orthodox processed black tea but has the infusion characteristics of CTC processed black leaf tea. Various methods are given to define orthodox appearance and CTC infusion character.

12 Claims, 6 Drawing Sheets

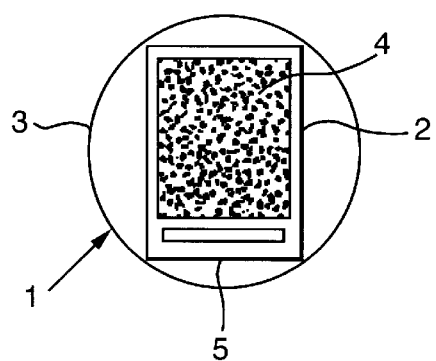
Fig.1.
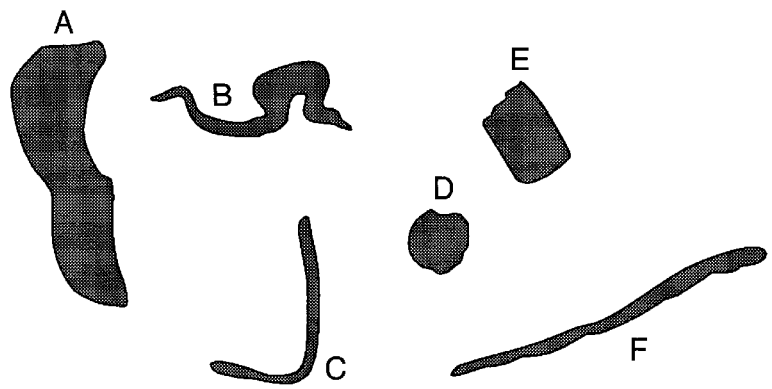
Fig.3a.
Fig.3b.

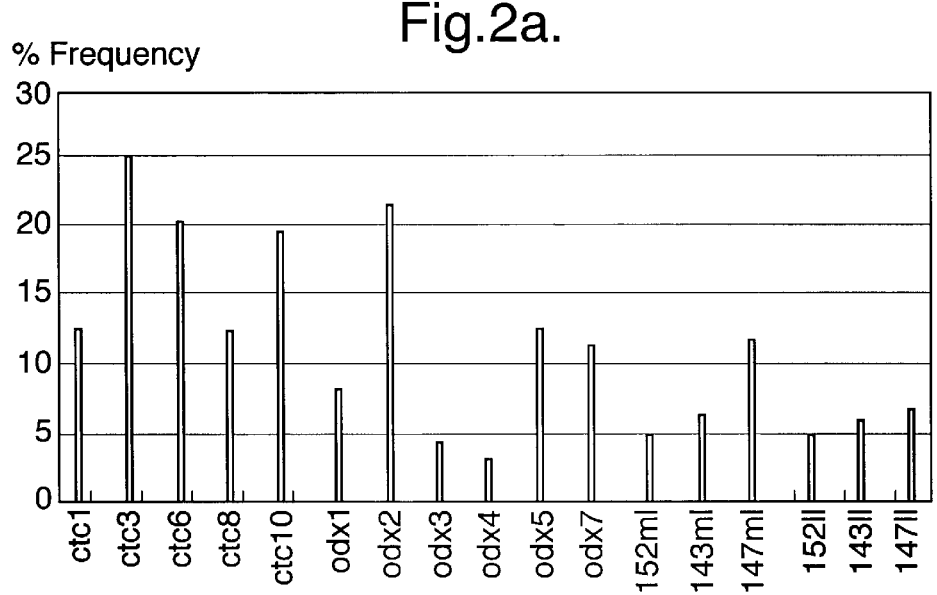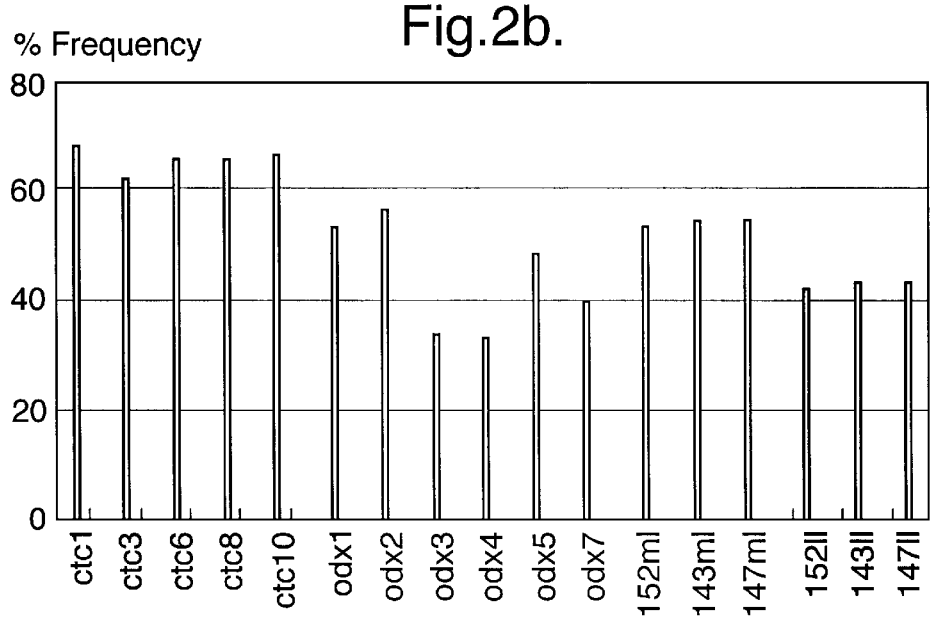

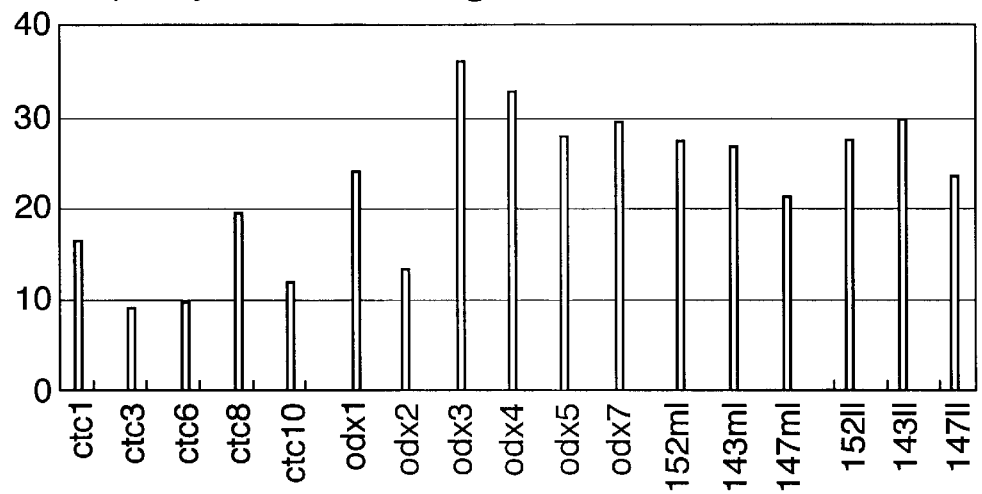
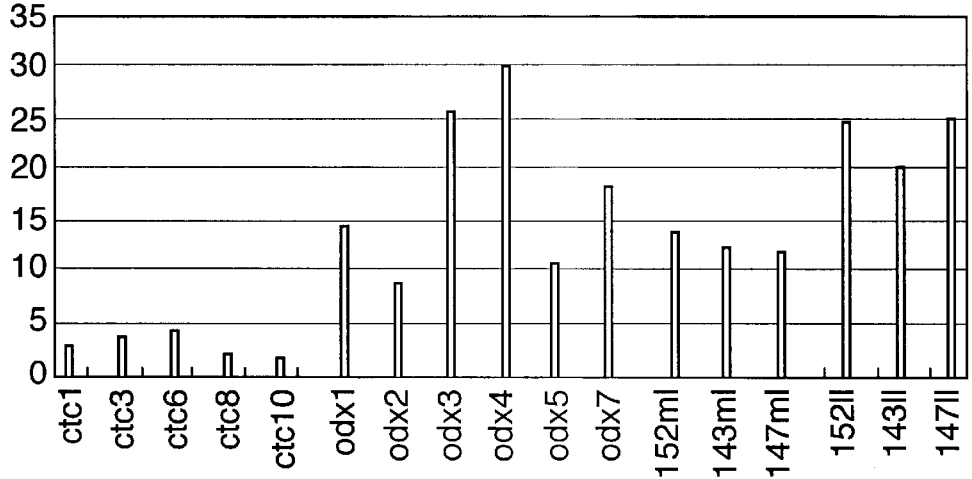

Standard infusion method

TEA PRODUCT

This is a continuation application of U.S. patent application Ser. No. 09/630,835 filed Aug. 2, 2000, now U.S. Pat. No. 6,432,467.

The present invention relates to a tea product, more specifically, certain black leaf teas that resemble orthodox processed tea but possess infusion characteristics more similar to that of CTC processed tea.

BACKGROUND AND PRIOR ART

Leaf tea may be prepared as green leaf tea or black leaf tea. Generally, to prepare black leaf tea fresh green leaves of the plant *Camellia sinensis* are withered (subjected to mild drying), comminuted, fermented (in which process enzymes in the tea leaf use atmospheric oxygen to oxidize various substrates to produce brown-coloured products) and then fired (to dry the tea leaves). Green leaf tea is not exposed to the fermentation process. Partial fermentation may be used to produce intermediate-type teas known as "oolong" tea.

Conventional wisdom dictates that in black tea manufacture tea must be macerated in some way to liberate the fermentative enzymes and their substrates within the leaves. One can macerate tea in many ways but broadly speaking there are two main mechanised methods for doing this.

The first, called "orthodox manufacture", involves rolling pre-weighed batches of withered tea leaves prior to fermenting, firing and drying steps. So called "orthodox tea" is typically characterised by withered leaf portions that are aesthetically pleasing to many but produce lighter liquors due to less extensive fermentation.

The second method is the most popular of a number of non-orthodox, continuous methods that involves using a machine resembling a mangle that cuts, tears and curls tea leaves. The original machine was invented by W. McKercher in 1930 and is commonly referred to as a CTC (cut-tear-curl) machine. The finely cut product is known generically as "CTC tea" and is characterised by a fast infusion rate and strong colour. This method tends to produce tea that is more consistent and uniform in quality than the orthodox method.

Both orthodox and CTC machines are often used in conjunction with a Rotorvane machine, which minces withered tea leaves. These methods and their history and role in tea manufacture are described in "Tea: Cultivation to Consumption" edited by K. C. Willson and M. N. Clifford, Chapman & Hall, 1992.

Generally speaking consumer preference for either orthodox or CTC tea is a matter of national or regional culture. In some countries the visual appearance and texture of leaf tea are important indicators of quality, larger leaf particles being associated with higher quality. In Western markets tea is increasingly purchased in filter paper bags and the colour of the infused product tends to be more important.

Some consumers however want the best of both worlds; i.e. a leaf tea that looks and feels like orthodox processed tea but has the liquor characteristics of a fuller fermented CTC processed tea. Unfortunately there is no commercially available tea manufacturing equipment that can deliver such a leaf tea.

In response to those needs, the present inventors have developed a black leaf tea that resembles orthodox processed tea but infuses like CTC processed tea.

In our co-pending international patent application PCT/EP99/00775 whole tea leaves are subjected to a heat shock at a temperature and for a duration that is sufficient to initiate fermentation, and enabling the tea to ferment for a time and at a temperature that is sufficient to achieve desired liquor properties. In our co-pending European patent application EP 98306543 whole leaf tea is impregnated tea leaves with liquid carbon dioxide within a pressure vessel, depressurising the vessel at a rate that is sufficient to freeze the liquid carbon dioxide, applying sufficient heat to cause the frozen carbon dioxide to sublime and consequently initiate fermentation within the leaves, allowing the tea to ferment for a time that is sufficient to achieve desired liquor properties, and drying the fermented product to yield the whole leaf tea.

Both methods can be used to make black leaf tea that resembles orthodox processed tea but has the infusion characteristics of CTC processed tea. A third method is described in our co-pending United Kingdom patent application GB 0010315.0.

The present inventors have investigated the product parameters of some of the most preferred products of the aforementioned methods and found they can be characterised as products per se, that is, irrespective of their method of manufacture.

STATEMENT OF THE INVENTION

In broad terms the present invention relates to black leaf tea that has the appearance of orthodox processed black tea but is characterised in that it has the infusion characteristics of CTC processed black leaf tea.

Orthodox appearance can be determined by an expert tea taster, a trained panel or image analysis. Preferably the leaf tea comprises whole leaf grades or leafy brokens.

The average length of the leaf tea is preferably at least three times the average width of the tea, especially or at least about 5% of the tea particles have a D-circle perimeter ratio of 1.6 or greater.

CTC infusion character can be determined by an expert tea taster, both in the presence or absence of milk, both qualitatively and quantitatively on a suitable industry scale.

A black tea of the present invention when infused in freshly boiled deionised water at a concentration of 10 g/l for 3 minutes preferably provides an infusion that has an a* value of 12 or greater and a b* value of 75 or greater, more preferably an a* value of 14 and greater and a b* value of 80 or greater, but especially an a* value of 16 and greater and a b* value of 85 or greater.

The black leaf tea preferably infuses in freshly boiled water at a rate in excess of that of the equivalent mass of the same tea of a comparable size that has undergone orthodox processing, but preferably at least as fast as the equivalent mass of the same tea that has undergone CTC processing.

"Tea" for the purposes of the present invention means leaf material from *Camellia sinensis* or *Camellia assamica*. It also includes rooibos tea obtained from *Aspalathus linearis* however that is a poor source of endogenous fermenting enzymes. "Tea" is also intended to include the product of blending two or more of any of these teas.

"Leaf tea" means tea that contains one or more tea origins in an uninfused form.

"Black leaf tea" means substantially fermented leaf tea.

"Whole leaf tea" includes tea leaves that are substantially intact, that is leaves that have not been macerated whether that be comminuted by cutting etc, disrupted by rolling, or by some other means. It could conveniently include single leaves, a cluster of leaves or the traditional two leaves and a bud. Substantial leaf fragments that are otherwise unmacerated may well behave like intact leaves and thus for the purposes of this invention they should be considered as "whole leaf tea" too.

For the avoidance of doubt the word 'comprises' is intended to mean including but not necessarily "consisting of" or "composed of". In other words the listed steps or options need not be exhaustive.

DETAILED DESCRIPTION OF THE INVENTION

The present invention relates to certain leaf black teas that resemble orthodox processed tea but infuse rapidly like CTC processed tea.

Whole leaf tea, it seems, withered or not, will not spontaneously ferment. It must be triggered. The applicant has found this can be achieved by the methods described in the aforementioned international patent application PCT/EP99/00775, European patent application EP 98306543, and United Kingdom patent application GB 0010315.0. The specifications of each are incorporated into the present specification by reference.

The present inventors have investigated the product parameters of some of the most preferred products of the aforementioned methods and found they can be characterised as products per se, irrespective of their method of manufacture.

The black leaf tea of the present invention can be characterised with respect to its orthodox appearance and CTC infusion character as will be described in the ensuing pages with reference to the accompanying drawings.

In the drawings:

FIG. 1 illustrates the predominant leaf tea shapes that were used to train a panel to distinguish between various leaf appearances. This is described in detail in Example 2.

FIGS. 2a to 2d are histograms showing the frequency distribution of D-circle perimeter ratio (DCPR) values for various teas examined in Example 3. These can be used to distinguish between orthodox and CTC leaf appearances. FIG. 2a represents the frequency distribution of DCPR values less than 1.2. FIG. 2b represents the frequency distribution of DCPR values between 1.2 and 1.39. FIG. 2c represents the frequency distribution of DCPR values between 1.4 and 1.59. FIG. 2d represents the frequency distribution of DCPR values of 1.6 or greater.

FIG. 3a shows the sample that was used in Example 4 to analyse the appearance of teas and generate characteristic "fingerprints" from which one can also differentiate orthodox and CTC teas.

FIG. 3b illustrates how the equipment used in Example 4 was set up to analyse the appearance of teas and generate the aforementioned "fingerprints".

ORTHODOX APPEARANCE AS DETERMINED BY AN EXPERT TEA TASTER

Figure 4A:
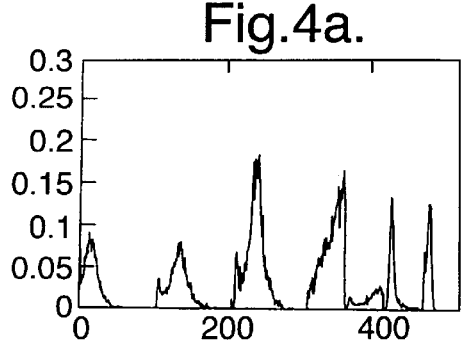
FIGS. 4a to 4c show the characteristic fingerprints of three samples of known orthodox manufactured teas that were generated using the method described in Example 4.

An expert tea taster can clearly distinguish teas that have the appearance of orthodox and teas that have the appearance of CTC processed tea (see Example 1). In layman's terms, orthodox tea tends to be flattened, rolled and twisted and CTC processed tea is more granular in appearance. While tea tasting (which includes grading) can appear to be more of an art than a science, the skilful precision with which experienced tea tasters can judge and categorise teas should not be underestimated.

ORTHODOX APPEARANCE AS DETERMINED BY A TRAINED PANEL

The applicant has found that panels can be trained to assess teas in order to obtain a quantitative description of leaf appearance. In the method described in detail in Example 2 known orthodox and CTC teas were subjected to image analysis. A number of predominant leaf shapes were identified (see FIG. 1) that were used to characterise the appearance of CTC and orthodox type black leaf teas. A leaf appearance panel was trained to recognise the leaf shapes using various commercially available teas. The panel performance was monitored to ensure consistency of scoring and agreement between panel members.

ORTHODOX APPEARANCE AS DETERMINED BY PARTICLE SIZE

Tea is commonly graded by particle size as measured by passage through meshes in a sorting machine. As explained in "Tea: Cultivation to Consumption" edited by K. C. Willson and M. N. Clifford, Chapman & Hall, 1992, pages 502, there is no international standard. The grades are given in Table 1 below however a tea taster or grader looks for other factors too. For example tea that passes through 8 or 10 mesh and over 14 mesh may be BOP or BP according to the fineness of the dhool from which it came, or whether it comes from cut leaf or not.

TABLE 1

Tea grades in descending order of particle size

| Grades | Abbreviation | Source |
| --- | --- | --- |
| Whole leaf grades | GFOP | Orthodox manufacture only |
|  | FOP |  |
|  | OP |  |
| Brokens | FBOP | Major products from rotorvane manufacture only |
|  | BOP |  |
|  | BP |  |
| Fannings | BOPF | Major products from CTC manufacture |
|  | OF |  |
|  | PF |  |
| Dusts | PD |  |
|  | RD |  |

The rotorvane machine was conceived as an attempt to make orthodox tea by a continuous process. Rotorvane processed tea should therefore be considered as orthodox tea. It is common to use a rotorvane machine as a pretreatment stage prior to CTC processing. Consequently, in the absence of an experienced tea taster or a trained panel one can characterise teas that have an orthodox appearance as preferably comprising whole leaf grades or brokens (particularly leafy brokens), especially those of broken orange pekoe (BOP) grade tea or larger.

A more detailed classification system is given in Tables 2 to 4 below. Under this system leaf description takes the form of a simple three-part code relating to method of manufacture/leaf size/leaf style as follows:

Manufacture: C—CTC; O—Orthodox; M—Mixed

TABLE 2

Leaf size classification

| CTC leaf size | Manufacturers' grades | ORTH leaf size | Manufacturers' grades |
|---|---|---|---|
| A | D2/CD | O | CD/D3 |
| B | D1 | P | D |
| C | D | Q | PD/SF |
| D | PD | R | BOPF/PF |
| E | SMALL FNGS/PF/PF1 | S | FNGS/FNGS2 |
| F | PF1 | T | BOP/LEAFY POBF/BT |
| G | LEAFY FNGS/SMALL BP | U | LEAFY BOP/SMALL PEKOE/FBOP |
| H | BP1/BOP | V | PEKOE |
| I | BOLP BP | W | LARGE PEKOE/BPS |
| J | BM | X | OP |
| K | BMF | Y | BP/BP2 |
|  |  | Z | BT2/BM |

TABLE 3

Leaf style classification

| Style | Leaf description |
|---|---|
| 1 | Powdery |
| 2 | Very stalky/fibrous |
| 3 | stalky/fibrous |
| 4 | Mixed/few fibres |
| 5 | Rather mixed |
| 6 | Fair |
| 7 | Good |
| 8 | Very good |
| 9 | Speciality/excellent style |

Equivalent size grades for teas manufactured using the two conventional methods are summarised in Table 4 below:

TABLE 4

Size grade concordance

| CTC leaf size | Orthodox leaf size |
|---|---|
| C | P |
| D | (P/Q) |
| E | Q |
| F | R |
| G | S |
| H | T |
| I | U |
| — | V |

The applicant has made black leaf teas by the process described United Kingdom patent application GB 0010315.0 that have been assessed by an expert tea taster to qualify for the following three-letter codes: OT5 and OTS for medium leaf (ML) teas and OV4 and OV5 for large leaf (LL) teas.

ORTHODOX APPEARANCE AS DETERMINED BY PARTICLE SHAPE

The flattening, rolling and twisting operations that typify orthodox black tea manufacture tend to produce slivers of leaf fragments whereas the more disruptive chopping action of CTC machines produces granular tea fragments that are more uniform in size and shape. One can therefore characterise teas that have an orthodox appearance as having an average length that is preferably at least twice the average width of the tea (i.e. an aspect ratio of 2:1), more preferably at least three times the average width of the tea (i.e. aspect ratio 3:1).

In an extension to this, as a further attempt to define orthodox appearance the applicant has devised a method for effectively measuring the roundness of tea fragments, or rather their deviation from perfect roundness (see Example 3). The method involves making images of tea fragments and measuring the D-circle perimeter ratio (DCPR). The DCPR is defined by the expression:

$$DCPR = \frac{P}{2 \cdot \sqrt{(A \cdot \pi)}}$$

wherein P is the observed perimeter of a particle and A is its observed area. It is in effect the ratio between the actual perimeter of an object and the perimeter of its D-circle—i.e. a hypothetical circle that has the same area as the object. This parameter has a minimum value of DCPR=1 (for a circle). All other shapes have DCPR values greater than one. It is independent of size.

The aspect ratio versus DCPR based on perfect rectangles can be compared as follows. Of course in practice the irregular edges of real tea particles would increase the DCPR slightly.

TABLE 5

Aspect ratio vs DCPR

| Aspect ratio | DCPR |
|---|---|
| 1:1 | 1.128 |
| 2:2 | 1.197 |
| 3:1 | 1.303 |
| 4:1 | 1.410 |
| 5:1 | 1.514 |
| 6:1 | 1.612 |
| 7:1 | 1.706 |
| 8:1 | 1.795 |
| 9:1 | 1.881 |
| 10:1 | 1.962 |

A black leaf tea of the present invention is one where preferably at least about 5% of the tea particles have a D-circle perimeter ratio of 1.6 or greater, more preferably at least about 10% of the tea particles have a D-circle perimeter ratio of 1.6 or greater, and even more preferably at least about 15% of the tea particles have a D-circle perimeter ratio of 1.6 or greater. This corresponds to an aspect ratio, for the relevant percentages, approaching 6:1.

ORTHODOX APPEARANCE AS DETERMINED BY IMAGE "FINGERPRINT"

In yet a further attempt to define orthodox appearance the applicant devised a more rigorous method for differentiating between orthodox and CTC tea appearance using an image analysis technique (see Example 4).

The method involves measuring the various aspects of the shape of samples of black tea leaves and mathematically analysing the distribution of these features.

The method can be used to derive a well-defined characteristic description vector or "fingerprint" for each sample which represents the type of black leaf. The applicant has found that fingerprints of orthodox teas have certain common features that are not found in fingerprints of CTC teas, and visa versa. More specifically the 1D histogram pertaining to oblateness tends to resemble a substantially symmetrical inverted hyperbola when the tea is CTC processed and a skewed inverted hyperbola or "wedge" when the tea is orthodox processed.

CTC INFUSION CHARACTER AS DETERMINED BY INFUSION PERFORMANCE

The black leaf tea of the present invention may resemble orthodox processed black tea, at least on a macroscopic level, but it does not exhibit the infusion characteristics of orthodox processed tea. The black leaf tea of the present invention exhibits infusion characterises normally only in seen in CTC processed teas. These characteristics include the rate and extent of infusion as evidenced by the amount of colour generated within a fixed time.

Infusion performance is determined in part by leaf particle size. Small leaves or leaf portions have a larger surface to volume ratio than large leaves or leaf portions and thus will tend to infuse faster than large leaves. The applicant has shown in Example 5 that when using comparable leaf sizes infusions of orthodox teas tend to be less red and more yellow than infusions of CTC teas and teas of the present invention, made by the process of United Kingdom patent application GB 0010315.0, infuse more like a CTC leaf tea than an orthodox leaf tea.

One can also derive from the results of Example 5 that 3 minute 10 g/l infusions of CTC manufactured teas in deionised water can be characterised by having an a* value of 12 or greater 12 and a b* value of 75 or greater. Preferred CTC-type infusing teas have an a* value of 14 and greater and a b* value of 80 or greater, whereas especially preferred CTC-type infusing teas have an a* value of 16 and greater and a b* value of 85 or greater. Ideally the black leaf tea of the present invention preferably infuses at a rate that is at least as fast as the equivalent mass of the same tea or one of a comparable size that has undergone CTC processing. The black leaf tea can be blended with traditionally processed black tea or tea granules in order to meet predetermined liquor characteristics.

CTC INFUSION CHARACTER AS DETERMINED BY LIQUOR QUALITY

CTC infusion character can be determined by an expert tea taster, both in the presence or absence of milk, both qualitatively and quantitatively on a suitable industry scale. Tea experts can rate liquor quality (i.e. measuring taste attributes including flavour volatiles), colour, brightness and thickness using a scale such as that used in Examples 6 and 7.

The black leaf teas of the present invention infused in the absence of milk (as is common in Continental Europe and USA) or with milk added (as is common in the United Kingdom) provide a liquor quality that resembles that of CTC manufactured teas rather than orthodox manufactured teas. The distinction was found to be more sharp when assessing the milked infusions. In fact the milked infusions of the black leaf teas of the present invention have been found to be as well coloured as the more colourful CTC infusions.

One might even define the black teas of the present invention as those which when infused in tap water (Crawley, United Kingdom) for 2 minutes and 15 seconds at a concentration of 13.3 g/l then milked by adding 10 ml milk per 235 ml infusion the liquor quality is between from 4 to 6, but preferably between from 5 to 6.

EXAMPLES

The black leaf tea of the invention will now be described with reference to the following examples.

Example 1

Differentiating Between the Appearance of Orthodox and CTC Teas Using an Expert Tea Taster The inventors asked an expert tea taster to select 17 teas from around the world, some orthodox and some CTC. They then asked the expert to classify those teas as well as two grades of each of five black leaf teas of the present invention made by the process described in our co-pending United Kingdom patent application GB 0010315.0 as being either orthodox or CTC teas. The results are given in Table 6 below.

TABLE 6

Comparison of known and novel teas by an expert tea taster

| Code | Type | Origin | Size | Leaf |
|---|---|---|---|---|
| ODX1 | Orthodox | Indonesia | BOPF | T5 |
| ODX2 | Orthodox | China | BOP | T3 |
| ODX3 | Orthodox | Assam | FBOP | U5 |
| ODX4 | Orthodox | Ceylon | EBOP | U8 |
| ODX5 | Orthodox | Ceylon | BOP | T5 |
| ODX6 | Orthodox | Indonesia | BOP | T6 |
| ODX7 | Orthodox | Ceylon | BOP | T5 |
| CTC1 | CTC | Siongo | BP1 | H6 |
| CTC2 | CTC | Ecuador | BP1 | H3 |
| CTC3 | CTC | Kavuzi | BP1 | H4 |
| CTC4 | CTC | Indonesia | BP1 | H3 |
| CTC5 | CTC | Vietnam | BOP | I3 |
| CTC6 | CTC | Malawi | BP1 | I4 |
| CTC7 | CTC | Kenya Rukuriri | BP1 | H7 |
| CTC8 | CTC | Kenya Bondet | BP1 | H4 |
| CTC9 | CTC | Ceylon | BP1 | H4 |
| CTC10 | CTC | Assam | BP | H5 |
| ML143 | - | Kenya, Kericho | ML | T4 |
| ML146 | - | Kenya, Kericho | ML | T4 |
| ML147 | - | Kenya, Kericho | ML | T4 |
| ML149 | - | Kenya, Kericho | ML | T4 |
| ML152 | - | Kenya, Kericho | ML | T5 |
| LL143 | - | Kenya, Kericho | LL | V4 |
| LL146 | - | Kenya, Kericho | LL | V5 |
| LL147 | - | Kenya, Kericho | LL | V4 |
| LL149 | - | Kenya, Kericho | LL | V4 |
| LL152 | - | Kenya, Kericho | LL | V4 |

The assessment is made on the basis of a number of factors including leaf size, twist, surface area and colour. In each case the tea taster classified the black teas of the invention as having an orthodox appearance.

Example 2

Differentiating Between the Appearance Orthodox and CTC Teas Using a Trained Panel The applicant developed a method for training a panel to obtain a quantitative description of leaf tea appearance.

Known orthodox and CTC teas were subjected to image analysis. A number of predominant leaf shapes were identified which were used to characterise the appearance of CTC and orthodox type black leaf teas. A leaf appearance panel was trained to recognise the leaf shapes using various commercially available teas. The panel performance was monitored to ensure consistency of scoring and agreement between panel members.

The predominant leaf shapes are illustrated in FIG. 1 and described as follows:

| | |
|---|---|
| A | OPEN - distinguishable as part of an open leaf |
| B | HIGHLY CURLED - and/or twisted. |
| C | ANGULAR - slightly curved. |
| D | SPHERICAL - 3-dimensional ball shaped. |
| E | RECTANGULAR - 2-dimensional/flat |
| F | STICK - Straight and narrow. |

Any fibre or stalk in the samples was excluded from this assessment.

Once trained the panel were asked to assess the appearance of 17 teas i.e. the seven reference orthodox teas used in Example 1, the ten reference CTC teas used in Example 1 and four black leaf teas of the present invention made by the process described in our co-pending international patent application GB 0010315. Samples were scored in isolated booths and assessors were not able to confer.

It was a design requirement that each assessor would evaluate each product three times in the course of the entire study, a total of 63 separate evaluations. The study was therefore divided into 7 assessment sessions, with each of 14 panelists assessing a different 9 of the 21 products at each session. This 'incomplete block' arrangement achieves better intercomparison between products than would be the case if every assessor received the same subset of products at a given session.

The order in which products are presented for assessment is always important in sensory work. The chosen design therefore ensured that presentation order was balanced i.e. for the panel of 14 assessors, each product would appear four or five 5 times in each serving position in the course of the entire study.

The presentation order was also balanced as far as possible for precedence or 'carry-over', so that no single product evaluation was unduly influenced by the immediately preceding product.

Each tea sample was assessed "blind" for leaf shape in triplicate by each panelist. The values for each shape indicate the number of times a sample was scored as a particular leaf shape. The CTC tea samples were predominantly assessed as spherical in leaf appearance, whereas the orthodox samples were a combination of rectangular, stick, angular and large/wide leaf shapes.

The results are given in Table 7 below.

TABLE 7

Comparison of known and novel teas by a trained panel

| | Predominant Leaf Shape | | | | | |
|---|---|---|---|---|---|---|
| Sample | A | B | C | D | E | F |
| ODX1 Indonesian Cibuni BOPF | 4 | | 1 | | 20 | 1 |
| ODX2 China BOP | 3 | | | | 22 | 1 |
| ODX3 Assam Gingia FBOP | 3 | 3 | 6 | | 1 | 12 |
| ODX4 Ceylon TOTW EBOP | 3 | 3 | 12 | | 3 | 4 |
| ODX5 Ceylon Diyagama West BOP | 4 | | | | 18 | 2 |
| ODX6 Indonesian Gunung Dempo BOP | 2 | 1 | 2 | | 15 | 5 |
| ODX7 Ceylon Bulk BOP | 6 | | 1 | | 16 | 4 |

TABLE 7-continued

Comparison of known and novel teas by a trained panel

| | Predominant Leaf Shape | | | | | |
|---|---|---|---|---|---|---|
| Sample | A | B | C | D | E | F |
| CTC1 Kenya Siongo BP1 | | | | 18 | 7 | |
| CTC2 Equador Sangay BP1 | | | | 23 | 3 | |
| CTC3 Malawi Kavuzi BP1 | | 1 | 1 | 15 | 7 | 1 |
| CTC4 Indonesian Kondang BP1 | | | | 22 | 4 | |
| CTC5 Vietnam Phu Ben BOP | | 1 | | 23 | 2 | |
| CTC6 Malawi Gotha BP1 | | | | 23 | 2 | |
| CTC7 Kenya Rukuriri BP1 | | | 1 | 21 | 4 | |
| CTC8 Kenya Bondet BP1 | | | | 19 | 5 | |
| CTC9 Ceylon Bulk BP1 | | 1 | | 19 | 4 | |
| CTC10 Assam Dekorai BP | | 1 | | 18 | 7 | |
| LL51 | 6 | 3 | 2 | | 6 | 6 |
| LL9 | 6 | 5 | 4 | | 9 | 4 |
| LL23 | 3 | 3 | 11 | | 2 | 9 |
| LL26 | 1 | 8 | 10 | | 5 | 4 |

The results clearly show that the leaf appearance of the black leaf teas of the present invention (modified rotorvane) more closely resembled the leaf appearance of the orthodox type teas than the CTC tea samples. This is evident by the black (test) teas of the present invention scoring significant number of A, B, C and F shapes commonly found in orthodox manufactured black leaf tea and none of the D shape that was found to predominate in CTC manufactured black leaf tea.

Example 3

Differentiating Between the Appearance of Orthodox and CTC Teas by Determining the D-circle Perimeter Ratio of Images of the Teas As mentioned above, the flattening, rolling and twisting operations that typify orthodox black tea manufacture tend to produce slivers of leaf fragments tea whereas the more disruptive chopping action of CTC machines produces granular tea fragments. The applicant has devised a method for effectively measuring the roundness of tea fragments, or rather their deviation from perfect roundness.

The method involves making images of tea fragments and measuring the D-circle perimeter ratio (DCPR). The DCPR is defined by the expression:

$$DCPR = \frac{P}{2 \cdot \sqrt{(A \cdot \pi)}}$$

wherein P is the observed perimeter of a particle and A is its observed area. It is in effect the ratio between the actual perimeter of an object and the perimeter of its D-circle—i.e. a hypothetical circle that has the same area as the object.

This parameter has a minimum value of DCPR =1 (for a circle). All other shapes have DCPR values greater than one. It is independent of size.

Tea samples were taken from the 21 "world teas" used in Example 1 and compared with samples of medium long leafed teas and long leafed teas prepared by the process described in our co-pending international patent application PCT/EP99/00775. In each case small samples were then taken randomly with a spatula.

Only the outline shape of the particles (i.e. silhouettes) of the particles needed to be imaged, not the surface detail. It was also important that shadows be avoided. The leaf samples were therefore spread out on a sheet of glass and back-illuminated on a WILD M8™ low power microscope. A magnification was chosen which allowed as many particles as possible per field, but at the same time allowed each particle to be sufficiently large for meaningful measurements to be taken. The magnification chosen gave a field size of 21×15.75 mm.

Images were grabbed using a JVC KY 55™ camera and a NOETECH™ frame grabber. The pixel resolution was 768×576. Some background was left visible in each micrograph in order to ensure that the particles had not been eroded by over-lighting. Twelve or fifteen fields were taken for each sample, giving a total particle count of typically 300–400. All images were permanently archived.

An image analyser (KONTRON KS 300™) was used to measure binary images (i.e. where all pixels are either black of white). The areas to be measured are rendered white, the background is black. 'Segmentation' is the process by which the binary image is generated from the original.

The original image was rendered monochrome. A threshold level was selected below which everything was rendered black (pixel value=0) and above which everything was rendered white (i.e. pixel value=255). The threshold level varied slightly from image to image, and was chosen to avoid either dilating or eroding the outline of the particles; it was generally around 140. This produced an image in which the particles were black and the background white.

The image was reversed (i.e. to produce white particles on a black background) and any particles in contact with the edge of the image (and therefore partly obscured) were deleted. The end result at this stage was a binary segmentation mask. These were also archived.

Prior to measurement, each image was put through an 'opening' procedure that alternately eroded and dilated particles three times. This had the effect of smoothing the surfaces slightly and removing small surface decorations which do not contribute to the overall shape or size of the object, but which can inflate an estimate of its perimeter. This part of the procedure was performed in the aforementioned KONTRON KS 300™ imager analyser.

Particles were then measured and the data aggregated from all the images in each sample set. The results obtained are given in Tables 8 below.

TABLE 8

Comparison of known and novel teas by measuring frequency of particles having certain D-circle perimeter ratios

| SAMPLE | % DCPR <1.2 | % DCPR 1.2–1.39 | % DCPR 1.4–1.59 | % DCPR ≥1.6 |
|---|---|---|---|---|
| ctc1 | 12.5 | 68.0 | 16.7 | 2.9 |
| ctc3 | 25.0 | 61.9 | 9.5 | 3.7 |
| ctc6 | 20.3 | 65.6 | 9.7 | 4.4 |
| ctc8 | 12.4 | 66.0 | 19.5 | 2.1 |
| ctc10 | 19.7 | 66.3 | 12.2 | 1.8 |
| odx1 | 8.1 | 53.4 | 24.3 | 14.3 |
| odx2 | 21.5 | 56.2 | 13.6 | 8.7 |
| odx3 | 4.3 | 34.2 | 36.2 | 25.3 |
| odx4 | 3.2 | 33.7 | 33.0 | 30.2 |
| odx5 | 12.6 | 48.8 | 28.0 | 10.6 |
| odx7 | 11.4 | 40.5 | 29.6 | 18.5 |
| ML152 | 4.9 | 53.3 | 27.5 | 14.2 |
| ML143 | 6.3 | 54.5 | 26.9 | 12.3 |
| ML147 | 12.1 | 55.0 | 20.9 | 11.9 |
| ML152 | 4.9 | 42.2 | 28.0 | 24.9 |
| ML143 | 6.1 | 43.9 | 29.7 | 20.3 |
| ML147 | 6.9 | 43.7 | 24.2 | 25.1 |

These results are presented as a frequency histogram in FIG. 2.

The DCPR frequency histograms clearly shows differences between the different types of products. The CTC teas show a much higher proportion of particles in the <1.2 DCPR class (10–25%) than in the ≥1.6 class (3–4%); i.e. they consisted in the main of low aspect ratio material. The orthodox teas were more variable. ODX2 was much like a CTC in character, whereas ODX3 & ODX4 showed only 3–4% in the <1.20 DCPR class but 25% & 30% in the ≥1.6 class. But in general, as best seen in FIG. 2d, known orthodox manufactured teas contain significantly more particles having a DCPR greater or equal to 1.6 than known CTC manufactured teas.

The black leaf teas of the present invention, once again prepared by the process described in United Kingdom patent application GB 0010315.0, showed a clear distinction between the large leaf and the medium leaf fractions: the large leaf fractions having 20–25% frequency, similar to the ODX 3 & 4 samples, and the medium leaf fractions showing frequencies of 12–14%, comparable to ODX 1, 5 and 7.

Example 4

Differentiating Between the Appearance of Orthodox and CTC Teas by Assessing Image Analysis Description Vectors or "Fingerprints"

The applicant has developed a method for differentiating between orthodox and CTC tea appearance using another image analysis technique. One might describe this in very simple terms as automating an expert tea taster.

The method recognises that at least some consumers perceive the quality of a black tea by its appearance, specifically colour, size and shape. One can attempt to quantify the overall appearance of certain leaves by focussing on samples of those leaves.

Within a given black tea there will be a significant population variation in the shape, texture and colour of the leaves. It is the distribution of these features that gives rise to certain properties of the tea including infusion performance and colour.

Shape analysis can be quantified using image analysis techniques to a high precision. The principal shape characteristics are leaf length, overall size, regularity of shape, surface roughness, leaf "wiggliness", meandering and degree of branching. Given reproducible sample preparation and imaging one can use image analysis to accurately measure parameters that quantify shape and other appearance measures. The combination of these different parameters can be mathematically combined in such a way as to derive a well-defined characteristic "fingerprint".

It was found that fingerprints of orthodox teas have certain common features that are not found in fingerprints of CTC teas, and visa versa.

For each leaf one obtains its measurements on the chosen parameters. Combining measurements on each of the leaves in the sample forms a mathematical description vector that defines its distribution of points across each of the parameters. By routinely re-sampling within the tea sample one is able to construct a profile of the population tea distribution. The degree of similarity between these description vectors of various tea samples can be assessed using statistical techniques (e.g. the chi square test). This approach enables conclusions to be drawn as to whether the samples arise from the same population or not.

EQUIPMENT

Sample preparation is critical. One such sample is represented in FIG. 3a as sample 1. Sample 1 was made by creating a mask 2 using MICROSOFT POWERPOINT™ presentation software. This was printed onto acetate material selected for its transparent properties. The mask 2 was then fixed to the lid of a petri dish 3 using 3M SPRAY MOUNT™ adhesive. The base of the petri dish 3 was subsequently used to protect and allow samples to be stacked. The surface of the mask 2 was sprayed with the same adhesive spray. Small quantities of tea leaves 4 were then sprinkled onto the mask 2 and manually separated using a scalpel. Between 400 and 1000 individual tea leaves were used in each sample dependant on tea type. The use of the spray overcame problems of static and once arranged prevented movement of the tea leaves while being transported to and from the imaging equipment. The mask 2 included a sample identification window 5.

Imaging equipment was set up as shown in FIG. 3b. The set-up included a camera 6, stand 7 and light sources 8 and 9. The camera 6 was a NIKON COOLPIX 950™ digital stills camera with a resolution of 2.1 megapixels. It was set as follows: Compression—JPEG (Fine); Metering—Matrix; White Balance—Manual; Focal Length—18 mm; Shutter Speed—1/200; F stop—10.5.

Two light sources 8 and 9 were used to provide front and rear illumination. The main source being the front one. The rear source helped to remove any shadow at the edges of the leaves. The first light source 8 was a KAISER RB5004/HF™ light source unit consisting of 4–36 Watt 5400 K high frequency fluorescent lamps (CRI>98). The second light source 9 was a FOSTEC DCR II™ light source consisting of a DC stabilised 150 Watt tungsten halogen source feeding via a fibre optic cable a backlight unit (Model A08927).

All lighting was allowed a 60 minute stabilisation period. After this period the camera colour balance was set manually. The samples were placed centrally beneath the camera and the image acquired. The images were then transferred to a computer via a compact flash card reader. All images were then checked for leaf separation and number using image analysis software (OPTIMAS 6™). Finally all images were transferred to CD for distribution.

MATHEMATICAL ANALYSIS

The aforementioned equipment was used to obtain information about the overall shape of the leaves which can be expressed as a topological skeleton and a distance map using the detailed algorithm published in "Determination and characterisation of the structure of a pore space from 3D volume images", by C. A. Baldwin, A. J. Sederman, M. D. Mantle, P. Alexander & L. F. Gladden, Colloid and Interface Sci., 181 79–92, 1996 and "Applications of Nuclear Magnetic Resonance Imaging in Process Engineering", L. F. Gladden and P. Alexander, Measurement Science and Technology, 7, 423–435, 1996.

The skeleton can be thought of as a reduction of the structure in the image to its minimal form which retains the basic connectedness of the original image; for the example of tea leaves we expect a long skeleton representing the basic "back bone" of the leaf shape together with some branching in regions where the leaf thickens or shows excessive surface roughness. The distance map provides a direct measure of how far each pixel within the binary image of the leaf is from the surface of the leaf.

From these images one can calculate various statistics such as the overall length of the skeleton, the relative length of the skeleton compared to the projected area of the leaf, the maximal end-to-end distance and how branched the skeleton, and from the distance map one can measure the "fatness" of the leaf image.

THE DESCRIPTION VECTOR OR "FINGERPRINT"

While the technique provides a variety of statistics for present purposes the following shape statistics were chosen:

1) Projected area of leaf (a)
2) Projected perimeter of leaf (p)
3) Compactness (c=p/a)
4) Oblateness (o=$|I_{xx}-I_{yy}|/(I_{xx}+I_{yy})$)
5) Skeletal length (l)
6) Normalised skeletal length (n=l/a)
7) Maximal distance map (d=maximum on distance map)

Thus for each leaf in a sample seven numbers were calculated that represented that leaf. These numbers are in terms of pixel dimensions. Naturally one does not image every leaf in a tea sample, but rather a subset of the leaves and for this subset there is a natural variation between the individual leaves. It is to a very large the extent of this variation that characterises the tea. The tea can therefore be thought of as being characterised by a distribution of points in a seven dimensional space (or a space of larger dimension for more statistics).

That distribution can be represented by forming a numerical representation in which one divides the space into bins of finite size in each dimension and determines the relative frequency of occurrence of a given leaf in each bin; i.e. by forming an N-dimensional histogram. Such an N-dimensional histogram can certainly be represented numerically, however the representation is not error free simply because of the small number statistics used in the analysis. For a bin in which we find some number of points the error in this number from sampling statistics of the true distribution is equal to the square root of the number this is actually measured.

One must therefore make sure that a large number of values from the analysis fall into each bin. Using the full N-dimensional space one would need to analyse a large number of tea images indeed to obtain sufficiently good statistics. Instead a series of one-dimensional histograms can be formed for each statistic. Such an approach minimises the errors but throws away information about the correlated properties of individual leaves; for example whether a leaf is both thin and large or fat and small. This sequence of 1D histograms forms the description vector or "fingerprint" wherein the peaks relate to the chosen shape characteristics—from left to right: projected area (a), projected perimeter (p), compactness (c), oblateness (o), skeletal length (l), normalised skeletal length (n) and maximal distance map (d).

RESULTS

Figure 5A:
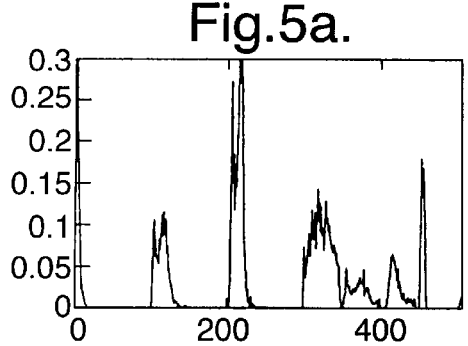
FIGS. 5a to 5c show the characteristic fingerprints of three samples of known CTC manufactured teas that were generated using the method described in Example 4.
Figure 4B:
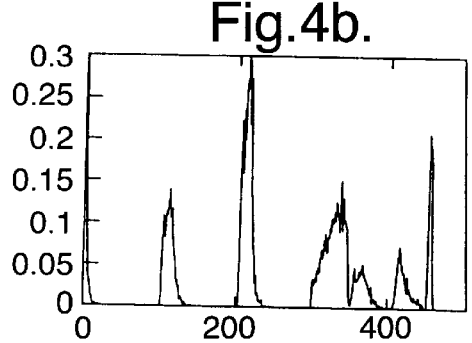
Figure 5B:
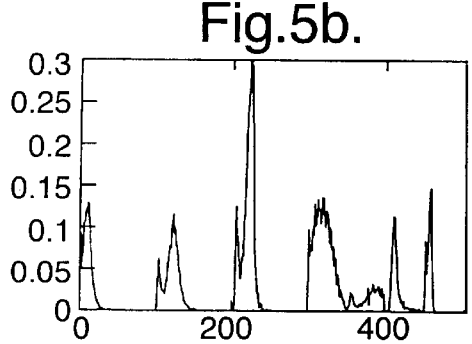
Figure 4C:
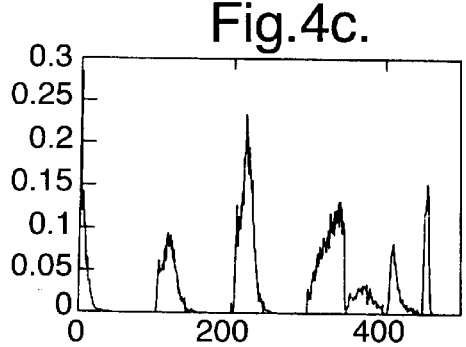
Figure 5C:
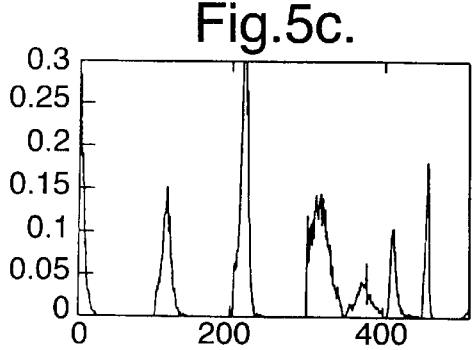
Figure 6:
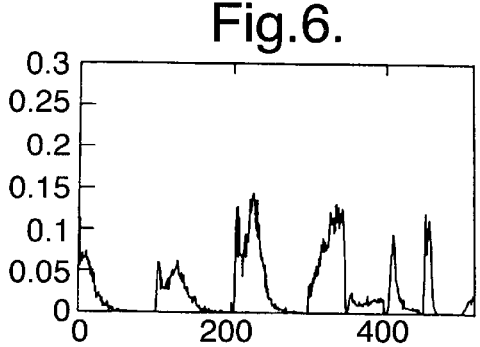
FIG. 6 show the characteristic fingerprint of a sample of a black leaf tea of the present invention that was generated using the method described in Example 4.

The characteristic fingerprints of three samples of known orthodox manufactured teas (odx3, odx5 and odx7 of the world teas used in Example 1) were generated using the aforementioned method. These fingerprints are illustrated in FIGS. 4a to 4c respectively. The characteristic fingerprints of three samples of known CTC manufactured teas (ctc3, ctc5 and ctc9 of the world teas used in Example 1) were generated using this method. These fingerprints are illustrated in FIGS. 5a to 5c respectively. The characteristic fingerprint of a sample of a black leaf tea of the present invention was also generated using this method. That fingerprint is illustrated in FIG. 6.

It is apparent from these results that fingerprints of orthodox teas have certain common features that are not found in fingerprints of CTC teas, and visa versa. More specifically the 1D histogram between 300 and 375 pertaining to oblateness (i.e the degree to which the equatorial diameter is greater than the polar diameter) tends to resemble a substantially symmetrical inverted hyperbola when the tea is CTC processed and a skewed inverted hyperbola or "wedge" when the tea is orthodox processed. The fingerprint of the black leaf tea of the present invention more closely resembles that of the orthodox teas as evidenced by the characteristic wedge shape of the oblateness peak.

Example 5

Differentiating Between the Infusion Performance of Orthodox and CTC Teas by Infusion Performance Orthodox manufactured teas generally infuse more slowly than CTC manufactured teas. This reflects the degree of maceration. One would therefore expect a black leaf tea that resembles orthodox tea will to infuse like an orthodox tea.

The inventors selected some of the 17 teas from around the world used in Examples 1 to 4 and compared the infusion performance of those teas against teas made by the process described in our co-pending United Kingdom patent application GB 0010315.0. The teas were selected purely on the basis of comparable leaf sizes. This was necessary since small leaves have a larger surface to volume ratio than large leaves and thus will tend to infuse faster than large leaves anyway.

In each case 200 ml boiling deionised water was added to a pre-warmed Thermos flask containing 2 g (±0.05 g) leaf tea. The flask was stoppered and briefly inverted, then the leaf was allowed to infuse for 3 minutes. The flask was then inverted again, and the liquor filtered through WHATMAN 541™ filter paper, using a Buchner funnel and flask under vacuum.

The colour of the infusions was measured on a HUNTERLAB ULTRASCAN Xe™ colorimeter using a standard analytical method (provided by the manufacturer). The results quoted in Table 9 below are for a 1 cm path length, with D65 illuminant and an observer angle of 10°.

TABLE 9

Infusion performance of leaf teas of comparable size

| SAMPLE | L* | a* | b* |
|---|---|---|---|
| ODX01 | 83.1 | 8.5 | 69.7 |
| ODX02 | 81.9 | 8.3 | 61.2 |
| ODX05 | 82.2 | 11.2 | 79.9 |
| ODX06 | 82.5 | 9.3 | 74.2 |
| ODX07 | 79.1 | 11.9 | 72.5 |
| CTC01 | 80.8 | 12.8 | 82.8 |
| CTC02 | 79.7 | 13.5 | 80.7 |
| CTC03 | 77.9 | 19.1 | 91.9 |
| CTC04 | 80.4 | 12.5 | 80.4 |
| CTC07 | 77.3 | 12.0 | 75.3 |
| CTC08 | 75.4 | 14.7 | 80.4 |
| CTC09 | 74.3 | 17.5 | 85.3 |
| CTC10 | 74.3 | 18.7 | 91.2 |
| ML143 | 80.45 | 14.12 | 82.92 |
| ML147 | 78.55 | 16.9 | 86.95 |

Figure 7:
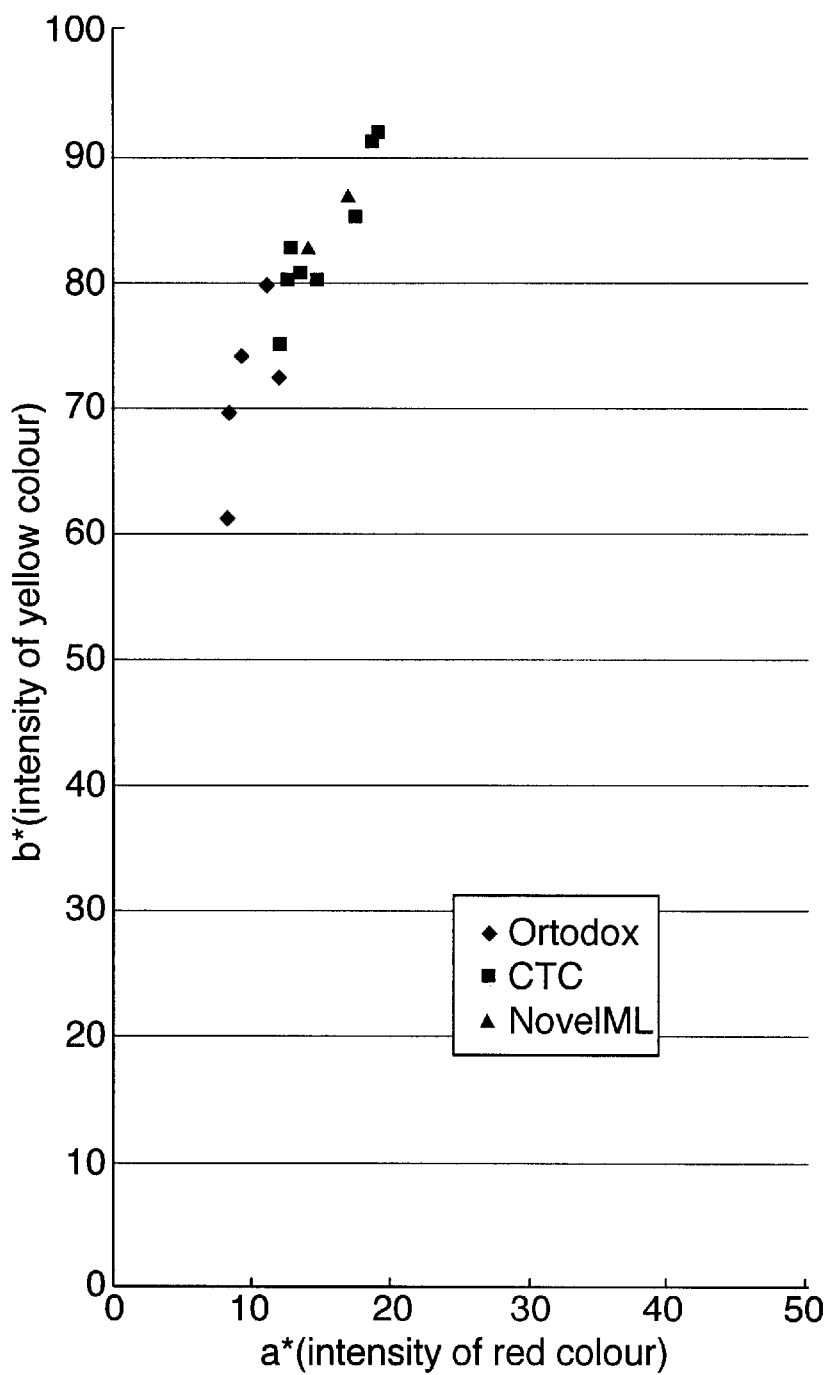
FIG. 7 is a graph of a* versus b* colour values of various teas of comparable size measured in Example 5 that shows the black leaf teas of the present invention produce infusions that are more typical of CTC manufactured teas than orthodox manufactured teas.

The a* and b* values were plotted to give FIG. 7. Each point on the graph plots the position of the liquor colour in colour space. Points nearer the top right hand corner of the graph represent liquors with stronger yellow or red components respectively.

On can see from FIG. 7 that the leaf teas of the present invention (ML143 and ML147) fall within the cluster of results for CTC teas rather than the cluster of results of the orthodox teas. This clearly demonstrates that the black leaf teas of the present invention infuse like CTC manufactured teas rather than orthodox manufactured teas.

Example 6

Differentiating Between the Infusion Performance of Orthodox and CTC Teas by Infusion Performance in the Absence of Milk The inventors infused each of the 17 teas from around the world used in Examples 1 to 4 and compared the infusion performance of those teas against teas made by the process described in our co-pending United Kingdom patent application GB 0010315.0.

In each case, to imitate the preparation of tea in Continental Europe, 2.0 g (±0.05 g) tea was infused in 250 ml of freshly boiled tap water (Crawley, United Kingdom) for 1.5 minutes and an expert tea taster assessed the liquor quality with respect to quality, colour, brightness and thickness.

Liquor quality was measured on a scale of from 0.6 to 9.4 as given in Table 10 below.

TABLE 10

Liquor quality assessment

| | | |
|---|---|---|
| Q - Quality | 0.6 (plain) | 9.4 (flavoury) |
| C - Colour | 0.6 (yellow) | 9.4 (red) |
| B - Brightness | 0.6 (dull) | 9.4 (bright) |
| T - Thickness | 0.6 (thin) | 9.4 (thick) |

The results are given in Table 11 below.

TABLE 11

Liquor quality assessment of non-milked infusions

| SAMPLE | Q | C | B | T |
|---|---|---|---|---|
| ODX01 | 4.0 | 3.0 | 4.2 | 3.0 |
| ODX02 | 2.6 | 2.6 | 2.8 | 2.6 |
| ODX03 | 4.4 | 2.2 | 4.0 | 4.0 |
| ODX04 | 4.0 | 4.4 | 4.4 | 4.6 |
| ODX05 | 5.2 | 2.2 | 5.4 | 3.0 |
| ODX06 | 4.6 | 2.0 | 5.6 | 2.6 |
| ODX07 | 4.4 | 3.0 | 5.2 | 4.0 |
| CTC01 | 5.0 | 4.0 | 6.0 | 3.6 |
| CTC02 | 3.0 | 4.2 | 5.0 | 3.4 |
| CTC03 | 4.0 | 4.2 | 5.0 | 2.2 |
| CTC04 | 3.4 | 4.6 | 5.0 | 3.0 |
| CTC05 | 2.8 | 4.4 | 4.6 | 3.6 |
| CTC06 | 2.6 | 3.2 | 4.0 | 3.0 |
| CTC07 | 5.6 | 2.0 | 6.0 | 2.8 |
| CTC08 | 4.6 | 4.6 | 5.8 | 4.6 |
| CTC09 | 3.6 | 4.4 | 5.6 | 4.0 |
| CTC10 | 4.8 | 4.0 | 5.8 | 5.0 |
| LL143 | 5.0 | 3.8 | 5.2 | 4.0 |
| LL146 | 4.6 | 4.2 | 5.2 | 4.2 |
| LL147 | 5.2 | 4.0 | 5.4 | 4.0 |
| LL149 | 5.0 | 4.2 | 5.2 | 4.2 |
| LL152 | 5.4 | 3.6 | 5.4 | 4.0 |
| ML143 | 4.8 | 4.4 | 5.2 | 4.4 |
| ML146 | 4.4 | 4.8 | 5.4 | 4.6 |
| ML147 | 4.6 | 4.4 | 5.4 | 4.4 |
| ML149 | 4.8 | 4.4 | 5.4 | 4.4 |
| ML152 | 5.0 | 4.0 | 5.4 | 4.0 |

Figure 8:
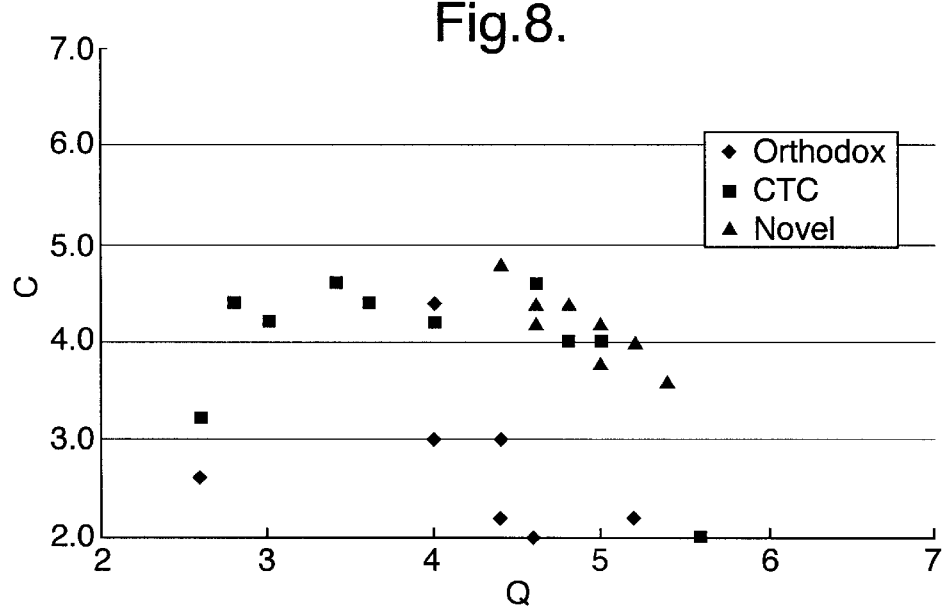
FIG. 8 is a graph of tea quality versus colour values of non-milked infusions of various teas as determined by an expert tea taster in Example 6.

The Q (quality) and C (colour) values were plotted to give FIG. 8. One can see from that Figure that the known CTC manufactured teas tended to provide more colourful infusions than the known orthodox manufactured teas. It is also clear from FIG. 8 that black teas of the present invention infuse in manner akin to the more colourful CTC manufactured teas rather than orthodox manufactured teas.

Example 7

Differentiating Between the Infusion Performance of Orthodox and CTC Teas by Infusion Performance in the Presence of Milk The inventors infused each of the 17 teas from around the world used in Examples 1 to 4 and compared the infusion performance of those teas against teas made by the process described in our co-pending United Kingdom patent application GB 0010315.0. In each case, to imitate the preparation of tea in the United Kingdom, 3.125 g (±0.05 g) tea was infused in 235 ml of freshly boiled tap water (Crawley, UK) and an expert tea taster assessed the liquor quality with respect to quality, colour, brightness and thickness. Liquor quality was measured on a scale of from 0.6 to 9.4 as given in Table 10 above. The results are given in Table 12 below.

TABLE 12

Liquor quality assessment of milked infusions

| SAMPLE | Q | C | B | T |
| --- | --- | --- | --- | --- |
| ODX01 | 4.2 | 3.2 | 4.4 | 3.6 |
| ODX02 | 2.4 | 2.0 | 2.0 | 2.6 |
| ODX03 | 4.2 | 2.6 | 4.6 | 3.8 |
| ODX04 | 3.8 | 2.8 | 4.0 | 4.6 |
| ODX05 | 5.6 | 3.6 | 5.8 | 3.2 |
| ODX06 | 4.4 | 3.2 | 5.4 | 3.0 |
| ODX07 | 4.0 | 2.8 | 4.6 | 4.0 |
| CTC01 | 4.6 | 4.0 | 6.0 | 3.6 |
| CTC02 | 2.8 | 4.2 | 4.4 | 3.0 |
| CTC03 | 3.8 | 6.6 | 4.2 | 2.2 |
| CTC04 | 3.2 | 5.0 | 4.0 | 2.8 |
| CTC05 | 2.8 | 4.2 | 4.4 | 3.8 |
| CTC06 | 3.0 | 5.8 | 4.0 | 3.0 |
| CTC07 | 5.6 | 4.0 | 6.4 | 3.0 |
| CTC08 | 3.6 | 7.2 | 3.6 | 4.2 |
| CTC09 | 4.0 | 4.0 | 5.0 | 4.0 |
| CTC10 | 4.6 | 4.0 | 6.0 | 4.6 |
| LL143 | 4.6 | 5.6 | 4.0 | 4.0 |
| LL146 | 4.2 | 5.6 | 4.2 | 4.0 |
| LL147 | 5.0 | 5.2 | 4.8 | 4.2 |
| LL149 | 4.6 | 5.4 | 4.4 | 4.0 |
| LL152 | 5.2 | 5.0 | 5.0 | 4.2 |
| ML143 | 4.4 | 5.8 | 4.0 | 4.4 |
| ML146 | 4.2 | 6.0 | 4.0 | 4.4 |
| ML147 | 4.6 | 5.6 | 4.4 | 4.4 |
| ML149 | 4.4 | 5.8 | 4.2 | 4.6 |
| ML152 | 5.0 | 5.0 | 5.0 | 4.2 |

Figure 9:
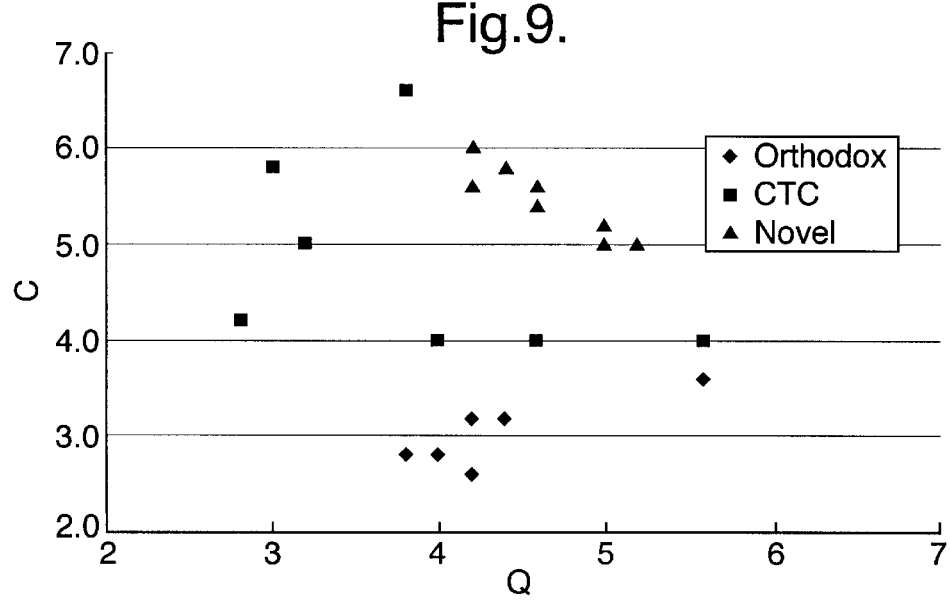
FIG. 9 is a graph of tea quality versus colour values of milked infusions of various teas as determined by an expert tea taster in Example 7.

The Q (quality) and C (colour) values were plotted to give FIG. 9. One can see from that Figure that all of the known CTC manufactured teas provided more colourful milked infusions than all of the known orthodox manufactured teas. It is also clear from FIG. 9 that black teas of the present invention provided milked infusions amongst the best of the known CTC manufactured teas.

We claim:

1. A black leaf tea that has an appearance and feel of orthodox processed black tea but is characterised in that it has infusion liquor performance of CTC processed black leaf tea.

2. The black leaf tea according to claim 1 wherein the leaf tea has an average length that is at least three times its average width.

3. The black leaf tea according to claim 2 wherein at least about 5% of the tea particles present have a D-circle perimeter ratio of 1.6 or greater.

4. The black leaf tea according to claim 2 wherein at least about 10% of tea particles have a D-circle perimeter ratio of 1.6 or greater.

5. The black leaf tea according to claim 4 wherein at least about 15% of tea particles have a D-circle perimeter ratio of 1.6 or greater.

6. The black leaf tea according to claim 5 wherein orthodox appearance is characterised by a 1D histogram for oblateness that approximates a skewed inverted hyperbola.

7. The black tea according to claim 6 that when infused in water for 3 minutes at a concentration of 10 g/l provides an infusion that has an a* value of 12 or greater and a b* value of 75 or greater.

8. The black leaf tea according to claim 1 wherein when infused in water for 2 minutes and 15 seconds at a concentration of 13.3 g/l then milked by adding 10 ml milk per 235 ml infusion gives a liquor quality is between from 4 to 6.

9. The black tea according to claim 1 which infused with water for 2 minutes and 15 seconds at a concentration of 13.3 g/l and is then milked by adding 10 ml milk per 235 ml infusion gives a liquor quality between 5 to 6.

10. The black tea according to claim 1 that when infused in water for 3 minutes at a concentration of 10 g/l provides an infusion that has an * value of 14 and greater and a b* value of 80 or greater.

11. The black leaf tea according to claim 1 wherein the tea infuses in freshly boiled water at a rate in excess of that an equivalent mass of tea that has undergone orthodox processing.

12. The black tea according to claim 1 which infused with water for 2 minutes and 15 seconds at a concentration of 13.3 g/l and is then milked by adding 10 ml milk per 235 ml infusion gives a liquor quality between 5 to 6.

* * * * *